United States Patent [19]

Loofbourow et al.

[11] 4,145,127

[45] Mar. 20, 1979

[54] FILM TRANSPORT AND CONTROL MECHANISM FOR MOTION PICTURE PROJECTORS

[75] Inventors: Donald I. Loofbourow, Canby; Robert E. Lach, Beavertown, both of Oreg.

[73] Assignee: GAF Corporation, New York, N.Y.

[21] Appl. No.: 780,646

[22] Filed: Mar. 23, 1977

[51] Int. Cl.² .......................... G03B 41/00; G03B 1/48
[52] U.S. Cl. ........................................ 352/79; 352/162; 352/169; 352/194; 352/221; 352/224
[58] Field of Search .................. 352/194, 162, 79, 221, 352/224, 169

[56] References Cited

U.S. PATENT DOCUMENTS

| | | | |
|---|---|---|---|
| 1,964,209 | 6/1934 | Morsbach et al. | 352/159 |
| 2,089,276 | 8/1937 | Lindstrom | 352/162 |
| 2,431,254 | 11/1947 | Jacobson | 352/221 |
| 3,014,404 | 12/1961 | Moore | 352/221 |
| 3,014,626 | 12/1961 | Groves | 226/62 |
| 3,135,156 | 6/1964 | Thevenaz | 352/194 |
| 3,136,209 | 6/1964 | Briskin et al. | 352/159 |
| 3,152,741 | 10/1964 | Jorgensen | 226/65 |
| 3,402,006 | 9/1968 | Bundschuh et al. | 352/79 |
| 3,427,101 | 2/1969 | Jorgensen | 352/79 |
| 3,514,196 | 5/1970 | Roman | 352/79 |
| 3,528,732 | 9/1970 | Procop | 352/194 |
| 3,536,388 | 10/1970 | Pickens et al. | 352/79 |
| 3,536,389 | 10/1970 | Reinsch | 352/194 |
| 3,600,074 | 8/1971 | Vemo | 352/194 |
| 3,630,422 | 12/1971 | Krtous | 226/62 |
| 3,642,356 | 2/1972 | Carignano | 352/169 |
| 3,736,052 | 5/1973 | Lecoeur | 352/166 |
| 3,749,482 | 7/1973 | Greenwood | 352/80 |
| 3,750,921 | 8/1973 | Bundschuh | 352/194 |
| 3,860,332 | 1/1975 | Ziegler | 352/194 |

Primary Examiner—Monroe H. Hayes
Attorney, Agent, or Firm—Walter C. Kehm; J. Gary Mohr

[57] ABSTRACT

A modular film transport and control mechanism for selectively advancing either regular 8mm or super 8mm perforated motion picture film through a projection gate is provided. The module comprises a film transport shuttle having a film engaging claw biased for engagement with the perforations of the film, a rotatable drive cam in operative engagement with the shuttle to reciprocally move the claw along horizontal and vertical paths to advance the film through the projection gate, and a pivotally mounted projection mode shifter interposed between the shuttle and the cam to transmit the desired horizontal motion from the cam to the shuttle, and selectively movable between at least two positions along a surface of the cam to change the mode of operation from normal projection to still projection. A control linkage connected to the shifter permits manual selection of the desired operating mode. The module also comprises a rotatable shutter mounted on a common shaft with the shuttle drive cam. The shutter has a weighted outer peripheral ring to provide additional inertial force for driving the shuttle. A projection gate-framer assembly comprising a pair of elongated plates having suitable projection apertures, and defining a passage therebetween for the film is slidably mounted on the module for selective movement between a position for projecting regular 8mm film and a position for projecting super 8mm film. A manually adjustable screw bears against an inclined cam surface in each of said positions to properly locate the selected projection aperture with respect to the film frames.

24 Claims, 18 Drawing Figures

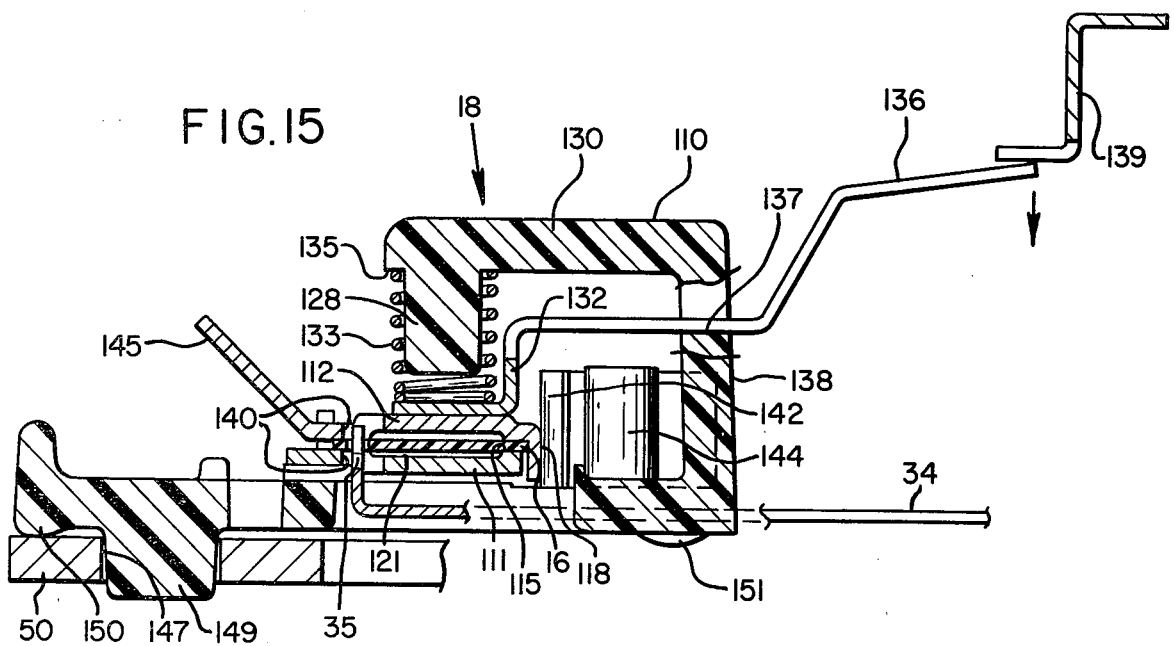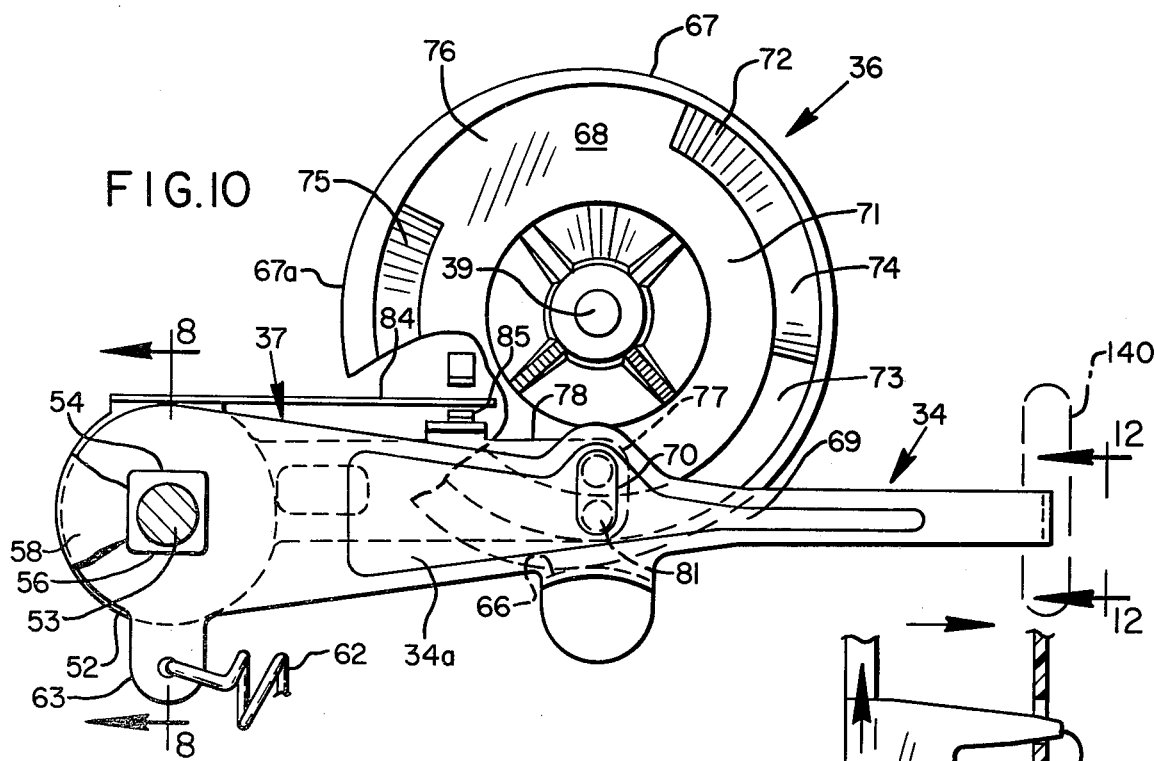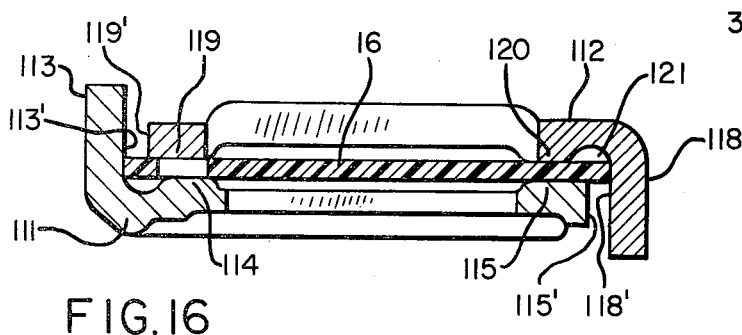

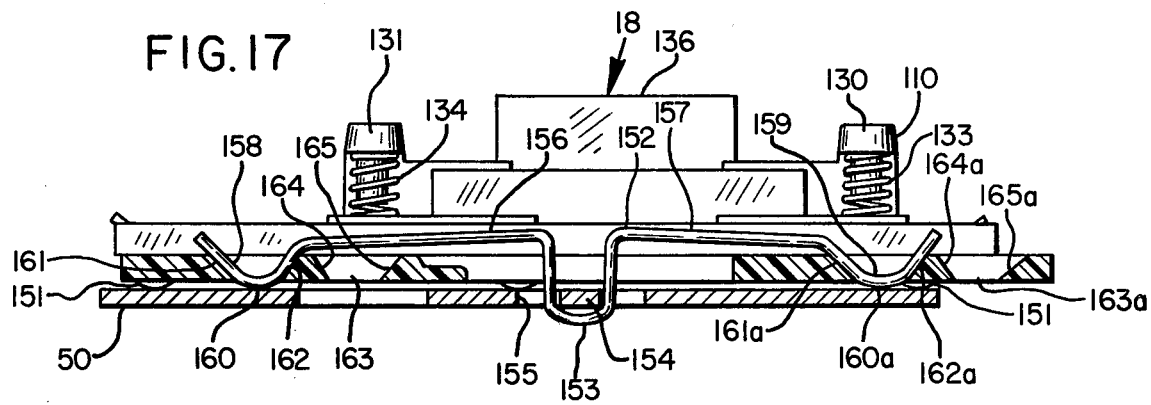
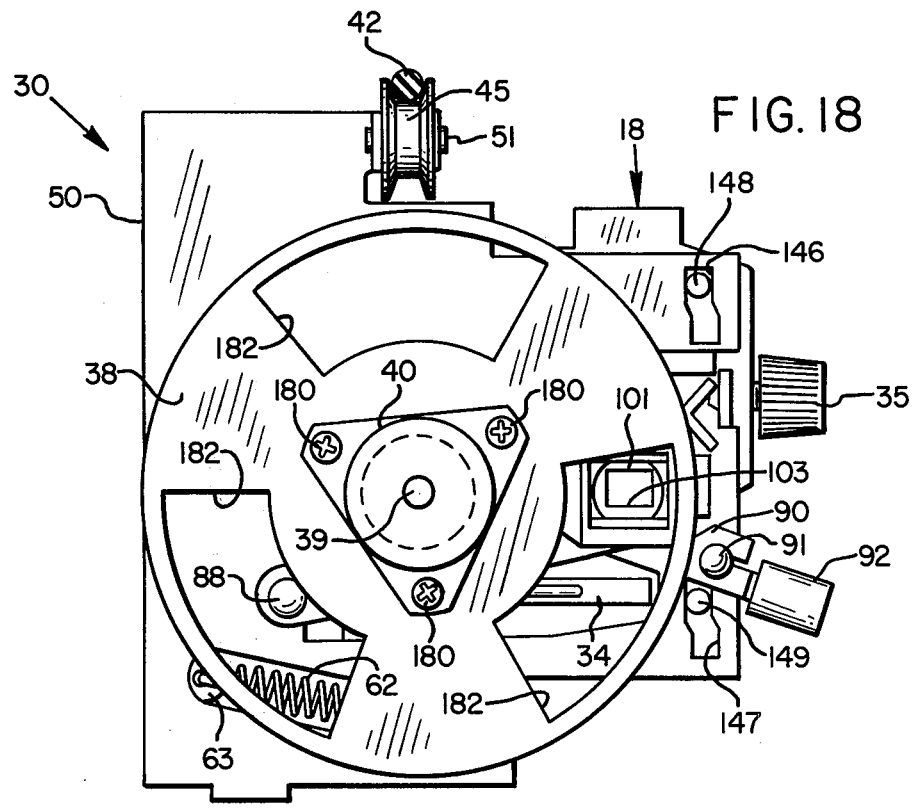
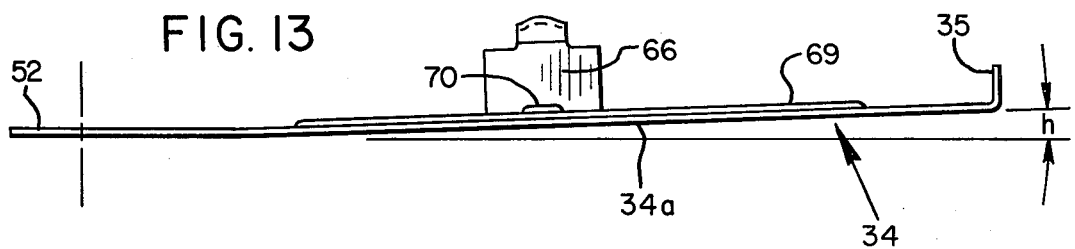

FILM TRANSPORT AND CONTROL MECHANISM FOR MOTION PICTURE PROJECTORS

BACKGROUND OF THE INVENTION

It is well known in the art to provide motion picture projectors which include means for incrementally advancing either regular 8mm film or super 8mm film through a projection gate in one of several modes of operation, such as forward or still projection. Projectors of this type generally employ a cam operated drive shuttle having a film engaging claw at one end which is adapted to engage the sprocket holes or perforations of the film. Rotation of the drive cam causes movement of the shuttle through a rectangular path in which the claw moves in reciprocal horizontal directions to engage and disengage the film and in reciprocal vertical directions to incrementally advance the film through the gate. Examples of such projectors can be found in U.S. Pat. No. 3,481,662 to Procop and U.S. Pat. No. 3,774,828 to Lach et al.

In many transport means the claw extends at right angles from the shuttle, and in those instances the shuttle may be formed of a flexible spring material to create an internal biasing effect to urge the claw into engagement with the film perforations, and to urge a cam follower formed on the shuttle into engagement with a contoured face of the drive cam to withdraw the claw from the film perforations during rotation thereof. A second cam follower formed on the shuttle is biased into engagement with a contoured peripheral cam surface of the drive cam to effectuate vertical movement of the shuttle. The respective cam surfaces of the face and the periphery of the cam are radially positioned with respect to each other to synchronize the horizontal shuttle reciprocation with the frequency of the vertical shuttle movement. U.S. Pat. No. 3,860,332 to Ziegler is illustrative of such a device. Unfortunately, the Ziegler patent makes no provision for varying the mode of operation of the projector, since a single cam profile is provided on both the face and periphery of the drive cam, thus providing only a forward projection capability.

In U.S. Pat. No. 3,600,074 to Ueno a similar film feeding mechanism is disclosed in which the speed of the film can be controlled. However, the Ueno two coaxial drive cams are provided. Up and down vertical movement of the shuttle is controlled by the peripheral surface of a first rotatable cam, and in and out horizontal movement of the shuttle is controlled by the face of a second rotatable cam. Speed changes are effectuated by varying the arcuate position of the first cam with respect to the second cam by means of a complex and costly gear reduction system. Another complex control mechanism is shown in U.S. Pat. No. 3,580,668 to Claar wherein speed changes are effectuated by relocating a cam follower on the shuttle to various cam surfaces on the drive cam.

Projectors of the type described, particularly those adapted for the consumer market, usually employ a film gate having means for selectively accommodating both regular 8mm film and super 8mm film. Since the size of the film frame as well as the position of the film perforations differ between each of said film sizes, the means employed in the past for accommodating both film sizes incorporated a longitudinally shiftable aperture plate having a different film aperture for each of said film sizes for selective movement, into position for alignment on the optical axis, and corresponding means for transversely shifting the gate to properly position the perforations thereof for alignment with the shuttle claw. Examples of shiftable film gates for at least two film formats can be found in U.S. Pat. Nos. 3,427,101 to Jorgensen et al, 3,514,196 to Roman, 3,528,732 to Procop and 3,536,388 to Pickens et al.

Proper framing is accomplished by changing the location of the path traveled by the claw either upwardly or downwardly so that each frame is properly positioned relative to the selected gate aperture. For this purpose framing means in the form of a manually controlled knob eccentrically mounted on the shuttle at the end opposite the claw have been provided to move the shuttle in the desired direction. Such framing mechanisms are shown in the aforementioned patents to Procop U.S. Pat. No. (3,481,662) and Lach et al, and have proven to be quite successful. It has been found, however, that the upward or downward displacement of the shuttle path may cause the claw to slide along and scratch the film prior to engagement with the perforations thereof until the film is properly aligned with the projection aperture.

SUMMARY OF THE INVENTION

The present invention represents a significant improvement over the various projector control means described hereinabove by providing, an improved film transport and control mechanism for advancing perforated motion picture film through a projection gate of a motion picture projector, which includes a simplified cam driven shuttle operable in various manually selectable modes, a shiftable film gate assembly for selectively receiving regular 8mm and super 8mm film, a framer formed as an integral element of the gate assembly, and a shutter, all disposed within a single unitary module for installation in a projector.

The improvement resides in the provision of a projection mode shifter interposed between the shuttle and the drive cam to transmit horizontal motion from the cam to the shuttle, and which is selectively movable between at least two positions along the face of the drive cam to change the mode of operation from normal projection in which the claw is permitted to engage the perforations of the film and still projection in which the cam via the shifter retains the shuttle in its withdrawn position to prevent engagement with the perforations of the film. By utilizing the shifter between the shuttle and the cam, mode changes can be effectuated without the necessity of complex linkages which were heretofore necessary to relocate the shuttle along various cam surfaces of the drive cam.

A further improvement resides in the provision of combined film gate-framer assembly in which a manually adjustable knob permits selection of the desired projection aperture for either regular 8mm film or super 8mm film, and facilitates fine framing adjustment by longitudinally moving the selected aperture with respect to the film, rather than moving the film with respect to the aperture by means of the shuttle.

A still further improvement over conventional projector control devices can be found in the modular concept of the invention, in which all of the essential drive and control means are contained in a unitary structure and are adapted to be driven by a single belt or other drive means connected thereto. The modular unit can be easily installed or removed from a projector and thus simplifies the construction and serviceability of the projector, and increases its desirability for use by the average consumer.

In general, the modular film transport and control mechanism of the invention comprises a module plate; a film gate assembly having a film passageway, a first projection aperture for a first format film, such as regular 8mm film and a second projection aperture for a second format film, such as super 8mm film, said assembly being slidably mounted on the module plate and selectively movable between a first position in which the first aperture is in alignment with the optical axis of the projector for projection of said first format film, and a second position in which the second aperture is in alignment with said optical axis for projection of said second format film; a drive cam rotatably mounted on said module plate having a contoured outer peripheral cam surface and a contoured cam face with at least two differing concentric circular cam sections corresponding to normal projection and still projection, respectively; a film transport shuttle for incrementally advancing film through the gate, pivotally mounted on the module plate adjacent the drive cam and having a claw extending at a right angle from one end thereof for engagement with the perforations of said film, a cam follower formed at a midpoint thereof adapted to slidably engage the peripheral cam surface of the drive cam for reciprocally moving said shuttle in a vertical path parallel to the film path, and a projection extending from the shuttle toward the drive cam; and a projection mode shifter interposed on the module plate between the shuttle projection and the drive cam, having a cam follower extending therefrom for engagement with the face of the drive cam; said shifter being pivotally movable between a first position in which the cam follower engages one of the circular cam sections on the face of the drive cam to transmit reciprocal horizontal motion from the cam to the shuttle in synchronization with the reciprocal vertical motion of the shuttle to move the claw in a generally rectangular path for intermittent engagement with the film to accomplish forward projection, and a second position in which the cam follower engages the other of said circular cam sections to hold the shuttle out of engagement with the film for still projection.

The drive cam is connected to the end of a shaft which is journaled through the module plate. The other end of said shaft carries a rotatable shutter which is radially positioned thereon relative to the contours of the various cam sections of the drive cam to synchronize shutter rotation with the in and out movement of the claw. The shutter has a weighted outer peripheral ring to provide additional inertial force to assist the cam in driving the shuttle. A pulley which forms the hub of the shutter is adapted to be connected by a belt to a drive motor to provide the motive force for the film projection system.

The film gate assembly comprises a housing slidably mounted on the module plate, and a pair of elongated plates disposed on said housing and having a first projection aperture for regular 8mm or other film having a particular frame and perforation format and a second projection aperture for super 8mm or such other film having the same width as the first film, but a different frame and perforation format, said plates defining therebetween a passageway for the film. The module plate includes a pair of inclined cam surfaces juxtaposed at right angles with respect to each other, and at an angle of approximately 45° to the direction of sliding movement of the film gate. An adjustment screw threadably extends through a portion of the film gate housing and has a knob at one end and an abutment surface at the other end adapted to bear against one or the other of the pair of inclined cam surfaces extending from the module plate. Rotation of the knob finely adjusts the position of the selected projection aperture with respect to the film frames and the optical axis. It will be understood that the screw engages one of the cam surfaces when the housing is in position for regular 8mm film projection and the other cam surface when the housing is in position for super 8mm film projection.

A bow shaped wire spring connects the module plate and the film gate housing and serves as a detent to hold the film gate housing in the desired position. For this purpose a loop in the center of the spring engages a tab on the module plate and the film gate housing is formed with depressions which are engaged by the distal ends of the spring. Moreover, the engagement of the spring and the depressions firmly holds the adjustment screw in contact with the appropriate inclined cam surface to facilitate framing adjustments.

Movement of the film gate housing along the module plate between the respective positions for projection of the various film formats is accomplished manually by means of the framing adjustment knob. The proper positioning of the housing during movement is accomplished by means of a pair of off-set slots formed in the module plate and a corresponding pair of projections formed on the film gate housing which slidably engage such slots. The shape of the slots is such that the housing is displaced in both the longitudinal and transverse directions during movement between the first film and the second film positions. The longitudinal displacement positions the selected projection aperture along the optical axis, and the transverse displacement locates the film perforations in the proper position for engagement by the claw.

In addition to the foregoing, the module plate also carries a manually operable control lever and bracket which operatively engages the shifter to permit the selection of the desired mode of operation. In this regard, it should be noted that a heat filter may be disposed between the projection bulb and the film gate during still projection to prevent burning of the film.

The invention is more fully described with reference to the accompanying drawings.

BRIEF DESCRIPTION OF THE DRAWINGS

FIG. 10 is a partial front elevation view of the mechanism shown in FIG. 3 with the mountings removed and illustrating the location of the drive cam, the shuttle and the shifter relative to each other in the still mode of operation.

FIG. 12 is an end elevation view taken along the lines 12—12 of FIG. 11 and illustrating the film engaging claw disposed at the end of the shuttle.

FIG. 13 is a top elevation view of the shuttle shown removed from the module of the invention.

FIG. 15 is a cross-sectional view taken along the lines 15—15 of FIG. 13.

FIG. 16 is a cross-sectional view taken along the lines 16—16 of FIG. 14.

FIG. 17 is a partial cross-sectional view taken along the lines 17—17 of FIG. 3.

FIG. 18 is a partial side elevation view of the film transport and control module illustrating the shutter taken along the lines 18—18 of FIG. 2.

DESCRIPTION OF PREFERRED EMBODIMENT

Figure 1:
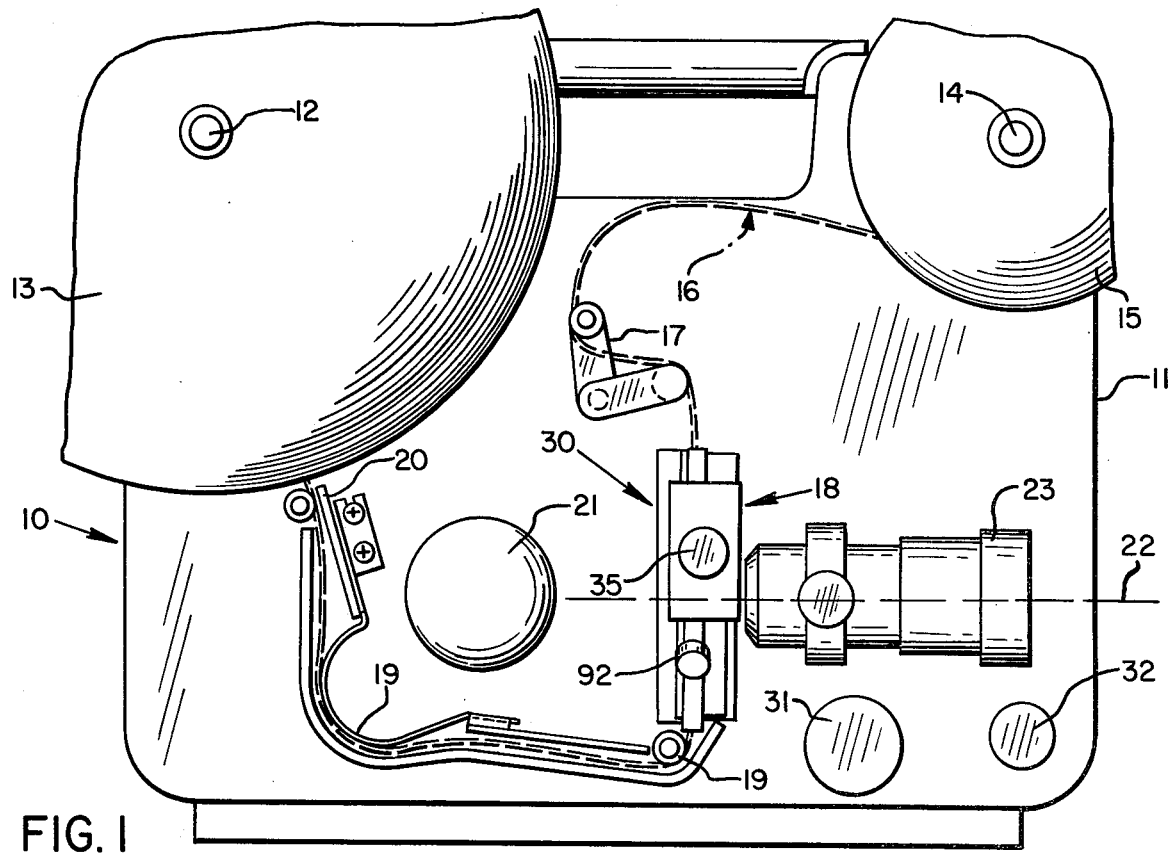
FIG. 1 is a side elevation view of a projector incorporating the film transport and control module of the invention.

Referring now to FIG. 1, a motion picture projector is indicated generally at 10 consisting of a projector case 11 upon which is journalled a spindle 12 supporting a take-up reel shown fragmentally at 13. A second spindle 14 is journaled at the forward part of the case 11 and mounts a supply reel 15 of conventional design. The path of the film as it is advanced from reel 15 to reel 13 is shown by the phantom lines 16, and while traveling in the direction of forward movement extends around a film buffer 17 through a film gate assembly 18 past a buffer 19, and finally through a take-up exit means 20. A projection bulb 21 illuminates the film as it is advanced incrementally past the optical axis 22 by means of the film transport and control mechanism 30 of the invention for projection on a remote screen (not shown) through a lens assembly 23 of conventional construction. A housing cover (not shown) is provided to enclose a portion of the film path and the projection components described above. A kob 35 disposed on the film gate assembly 18 and extending outwardly from the front of the projector is provided for manual framing adjustment and positioning of a suitable aperture on the optical axis for projection of either regular 8mm or super 8mm film. A control knob 31 disposed immediately below the lens assembly 23 is provided to select a desired mode of projector operation, such as off, forward project and rewind, and a further control knob 92 is provided on the film transport and control mechanism 30 to permit still projection. Knob 32 is provided to adjust the position of lens assembly 23 along the optical axis for proper focusing.

Figure 2:
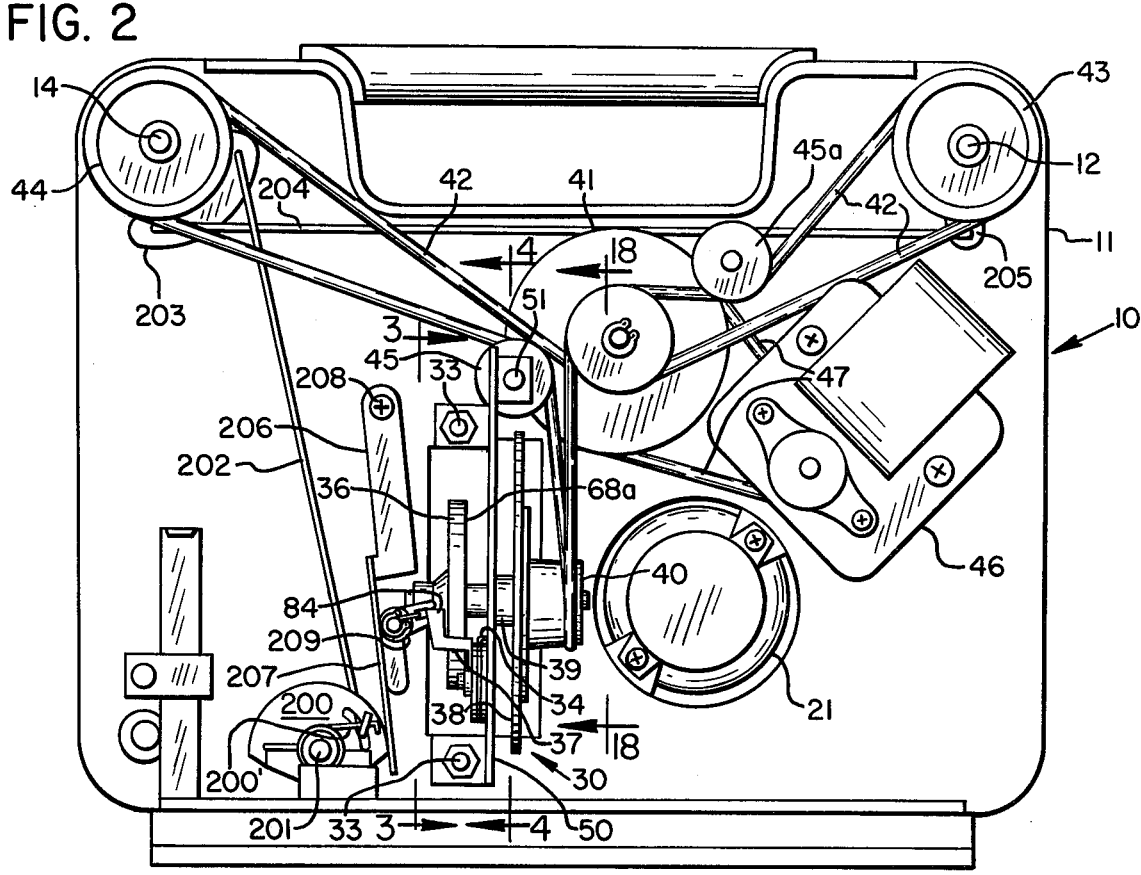
FIG. 2 is a side elevation view of the side opposite that shown in FIG. 1 with the housing removed to illustrate the film transport and control module and the drive linkage of the projector.

The opposite side of projector 10 is shown in FIG. 2 with the cover removed to illustrate the various operational components which serve to control the film transport and control mechanism 30, control the take-up and supply reels and condition the mechanical and electrical components to perform the various modes of operation.

The film transport and control mechanism 30 which forms the basis of the instant invention comprises a single module removably mounted on the rear of case 11 by means of bolts 33. The module 30, which will be described in detail hereinafter, includes film gate assembly 18, a shuttle 34 having a pair of claw members 35 as seen in FIG. 12 disposed at one end thereof for intermittently engaging the perforations of film 16 to advance such film through gate 18, a cam 36 to reciprocally move the shuttle 34 along horizontal and vertical paths to effectuate film advancement, a shifter 37 interposed between the shuttle 34 and the cam 36 to transmit the desired horizontal motion from the cam to the shuttle, and selectively movable between various positions along the face 68 of the cam 36 to effectuate normal projection and still projection.

The module 30 also includes a rotatable shutter 38 mounted on a common drive shaft 39 with the drive cam 36. The shutter carries a pulley 40 which imparts rotational movement to the shutter and the cam. Pulley 40 is operatively connected to a main drive pulley 41 by means of a common drive belt 42, which extends from the main drive pulley 40 to a pulley 43 of the take-up spindle 12, a pulley 44 of the feed spindle 14, and pulley 40 of the film transport and control mechanism 30. A pulley 45 is mounted on module 30 to properly guide belt 42 between pulley 44 and pulley 40. Similarly, another pulley 45a is rotatably mounted on case 11 to guide the belt between take-up pulley 43 and the drive pulley 41. An electric drive motor 46 is operatively connected via belt 47 to drive pulley 41 to impart the required rotational movement thereto.

A cam 200 disposed at the lower part of the projector is journaled for rotational movement with control knob 31 by means of a common shaft 201 extending through case 11. A control rod 202 has one of its ends positioned in a slot of cam 200 being held therein by spring 200′. At the other end the rod 202 is connected to clutch means 203 which in turn is connected to feed reel pulley 44. The clutch means 203 and 205 referred to herein are preferably of the type of clutch mechanisms disclosed in applicant's U.S. Pat. No. 4,103,846. A second rod 204 operatively connects clutch means 203 to additional clutch means 205 for controlling take-up reel pulley 43. During forward projection the clutch means 203 allows the feed reel pulley 44 to rotate with substantial freedom, while take-up pulley 43 is frictionally coupled to the take-up spindle 12 by means of clutch means 205. During rewind operation of the projector, clutch means 203 is engaged so that feed pulley 44 is frictionally engaged with the supply spindle 14 and the take-up pulley 43 is allowed to rotate with substantial freedom. As noted in the above mentioned copending application, means are provided to supply some degree of drag on the take-up and feed pulleys. Rotation of cam 200 by knob 31 causes movement of the control rods 202 and 204 to actuate and deactuate the clutch means as desired.

A lever 206 having a cam follower extension 207 in operative engagement with cam 200 is pivotally connected to case 11 by means of screw 208. An actuator bracket 209 is disposed in operative engagement with both the shifter 37 and cam follower extension 207 to move the shifter between the various projection modes. A spring (not shown) biases cam follower extension 207 into engagement with cam 200, so that rotational movement thereof positions the shifter in the desired position.

It should be noted that the film transport and control module 30 of the invention is shown installed in the projector of FIGS. 1 and 2 for illustrative purposes only, and that such module is readily adaptable for use in motion picture projectors having other drive configurations, provided only that rotational motion be imparted to pulley 40. All of the components of module 30 are mounted on a removable module plate 50 (see FIGS. 3 and 4) which is adapted to be easily installed and removed from a motion picture projector. The plate 50 has a shaft 51 journaled at the upper portion thereof for carrying the guide or idler pulley 45 over which the drive belt 42 is extended. Such pulley is provided specifically for use with drive belt 42 and may be omitted if other drive means are provided for pulley 40.

Since module 30 includes several individual interacting components for advancing and controlling the movement of film in a motion picture projector, it shall be described hereinafter in reference to each of such components.

SHUTTLE-SHIFTER MECHANISM

Figure 9:
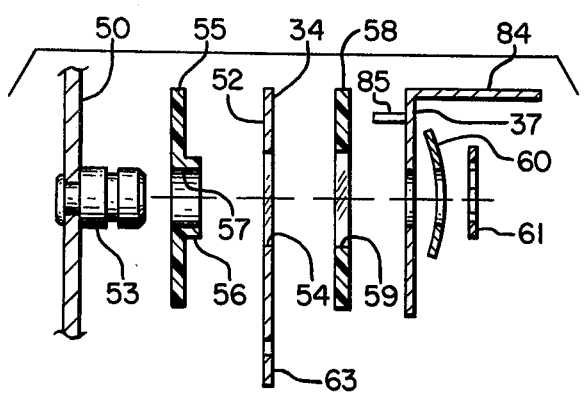
FIG. 9 is an exploded cross-sectional view taken along the lines 9—9 of FIG. 3.

The shuttle 34, which is best illustrated in FIGS. 9 to 13, comprises an elongated lever 34a having a pair of claw members 35 extending at right angles at one end thereof for intermittent engagement with the perforations of film 16. The other end 52 of the shuttle is mounted pivotally on module plate 50 by means of a shaft 53 and a bearing washer 55. As shown in FIG. 9 shaft 53 is fixedly staked to plate 50 and slidably extends through a circular central opening 57 in washer 55. The washer 55 has a square projection 56 which engages a corresponding square opening 54 in shuttle 34 to provide a stable mounting for the shuttle. A second washer 58 has an opening 59 and is disposed on the opposite side of shuttle 34 and is carried about the square projection 56 of washer 55. The shifter 37 is also carried on shuttle shaft 53 and is positioned in place by a bowed washer 60 and a snap type retaining ring 61.

A tension spring 62 shown in FIGS. 3, 4, 10 and 11 urges the claw member 35 of shuttle 34 into a vertical position representing the top or beginning of the film advancement stroke. Spring 62 is connected at one end to an opening in a lobe 63 extending from the lower portion of end 52 of the shuttle and is connected at its other end to an opening 64 formed in plate 50. A slot 65 is provided in plate 50 for receiving spring 62.

To effectuate downward vertical movement of claw member 35 to advance film 16 through the projection gate, the shuttle is provided with a cam follower surface 66 which is biased into sliding engagement with the outer peripheral surface 67 of drive cam 36, as shown in FIGS. 7, 8, 10 and 11, by means of spring 62. Cam surface 67 is contoured with a lobe 67a to pivotally move shuttle 34 from a position at the top of its vertical film advancement stroke to a position at the bottom of such stroke, overcoming the biasing force of spring 62. The contour of cam surface 67 is such that the shuttle is oscillated through one complete vertical film advancement stroke for each rotation of cam 36.

During film advancement the claw member 35 follows a generally rectangular path as shown in FIG. 12. As noted above, the movement of claw member 35 through the up and down vertical portions of its path is accomplished by the interaction of spring 62 and the oscillating movement of cam surface 67. The in and out horizontal reciprocation of the claw to effectuate film engagement and disengagement is also accomplished by a biasing force applied to the shuttle and the rotational movement of cam 36. As shown in FIG. 13, the end 52 of shuttle 34 is offset from the plane of lever 34a by a distance h. The shuttle is formed of spring steel so that said offset biases claw member 35 into engagement with the sprockets of film 16. In addition, shuttle 34 is formed with an intermediate raised section 69, illustrated in FIGS. 10, 11 and 13, to provide structural stability, and a projection 70 extending from raised section 69 which is held by the internal biasing of the shuttle in slidable engagement with shifter 37. Oscillating horizontal motion is imparted via the shifter 37 to projection 70 by cam face 68 of drive cam 36. As noted hereinbefore, the shifter 37 is mounted on shaft 53 together with shuttle 34, and is pivotally movable in a vertical plane relative to the shuttle 34. In addition, the shifter is also pivotally movable in a horizontal plane to follow the oscillating movement of cam face 68. The use of bowed washer 60 on shaft 53 permits such movement.

Figure 7:
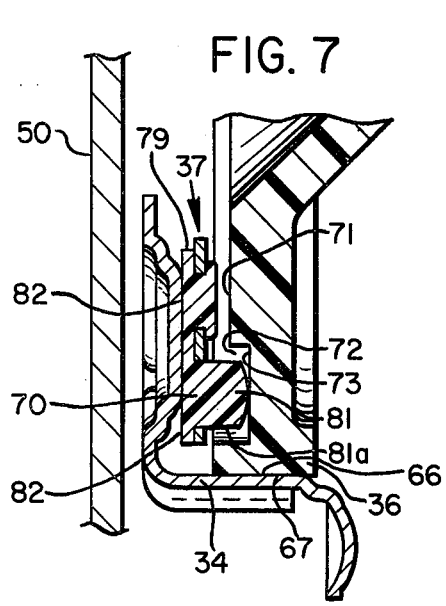
FIG. 7 is an enlarged partial cross-sectional view illustrating the respective positions of the shuttle, the shifter and the drive cam in the forward mode of operation.
Figures 8, 11:
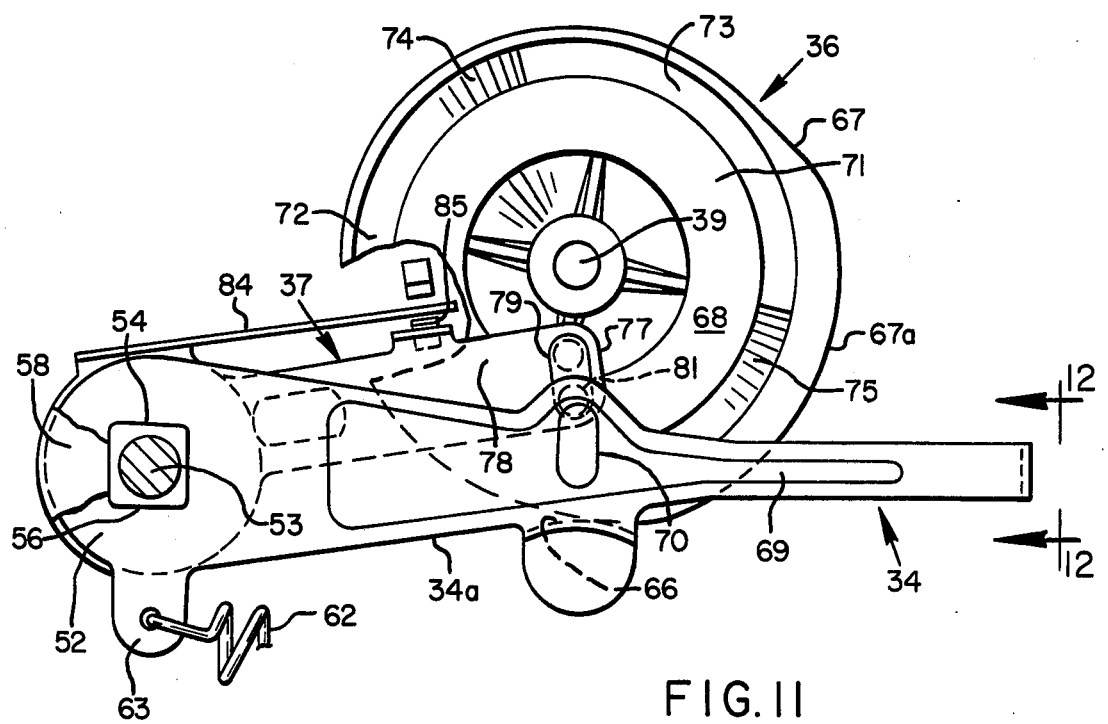
FIG. 8 is another enlarged cross-sectional view similar to FIG. 7, illustrating the still mode of operation.
FIG. 11 is a partial front elevation view similar to that of FIG. 10, illustrating the forward mode of operation.

As shown in FIGS. 10 and 11 the shifter 37 comprises an elongated arm 78 having its distal end 77 disposed intermediate projection 70 of the shuttle and cam face 68 of the drive cam. In FIGS. 7 and 8 it can be seen that a plastic plate 79 is fixedly mounted on said end 77. The plate includes a first projection 80 which extends through a suitable circular opening in the shifter 37 to stake the plate 79 thereto, and a second projection 81 which likewise extends through a circular opening in end 77 of shifter 37 to serve as a cam follower. The surface 82 of plate 79 provides a riding surface for projection 70 of shuttle 34 for translating cam oscillation from the cam face 68 to the shuttle. Cam follower 81 is held in direct sliding engagement with cam surface 68 by means of the biasing forces of shuttle 34 and shifter 37 which are transmitted through plate 79.

The cam surface of cam face 68 is contoured with a plurality of cam sections for the different modes of operation of the projector. A first annular cam section 71 is adapted to hold back the shuttle against its biasing force and entirely prevent the engagement of claw member 35 with the film 16 during still projection, rewinding and loading. A second circular cam section 72 disposed radially outwardly of cam section 71 is contoured so as to provide complete horizontal oscillation of the claw during each revolution of cam 36, to accomplish forward advancement of the film through the gate for normal projection. Cam section 72 includes a depressed arcuate section 73 which permits the inward biasing force of the shuttle to move the claw into engagement with the film perforations and a flat arcuate section 76 which holds the shuttle out of engagement with the film against its biasing force. A pair of inclined arcuate cam sections 74 and 75 extending between cam sections 73 and 76 provide for inward and outward horizontal movement of claw member 35 by the interaction therewith of cam follower 81 on shifter 37. The arcuate length of each cam section is such that the claw member is oscillated through a full horizontal cycle during each revolution of the cam 36. It should be noted that each arcuate section of cam surface 72 is radially positioned on cam 36 relative to the peripheral cam surface 67, so that the horizontal and vertical oscillations of the shuttle are synchronized to follow the generally rectangular path shown by the arrows in FIG. 12.

It will be appreciated that, although it is not shown, it is contemplated that additional cam sections and contours can be formed on the face 68 and periphery 67 of cam 36 to provide additional projection modes, such as reverse projection.

Referring now to FIGS. 7 and 11, the shifter 37 is shown with cam follower 81 in engagement with cam section 72 of the drive cam 36 to provide normal forward projection. It can be seen that the rotational movement of cam 36 causes both horizontal oscillation and synchronized vertical oscillation to effectuate film advancement through the projection gate.

In FIGS. 8 and 10 the shifter 37 is shown in the still mode of operation wherein cam follower 81 is in operative engagement with cam face section 71 to hold the claw member 35 out of engagement with the film perforations. However, due to the rotation of the cam, the claw will continue to oscillate through the vertical portion of its travel path. This is noteworthy since the cam rotates during the rewinding and the film loading operations of the projector but the still projection position is utilized to prevent engagement of the film by the claw.

Figure 3:
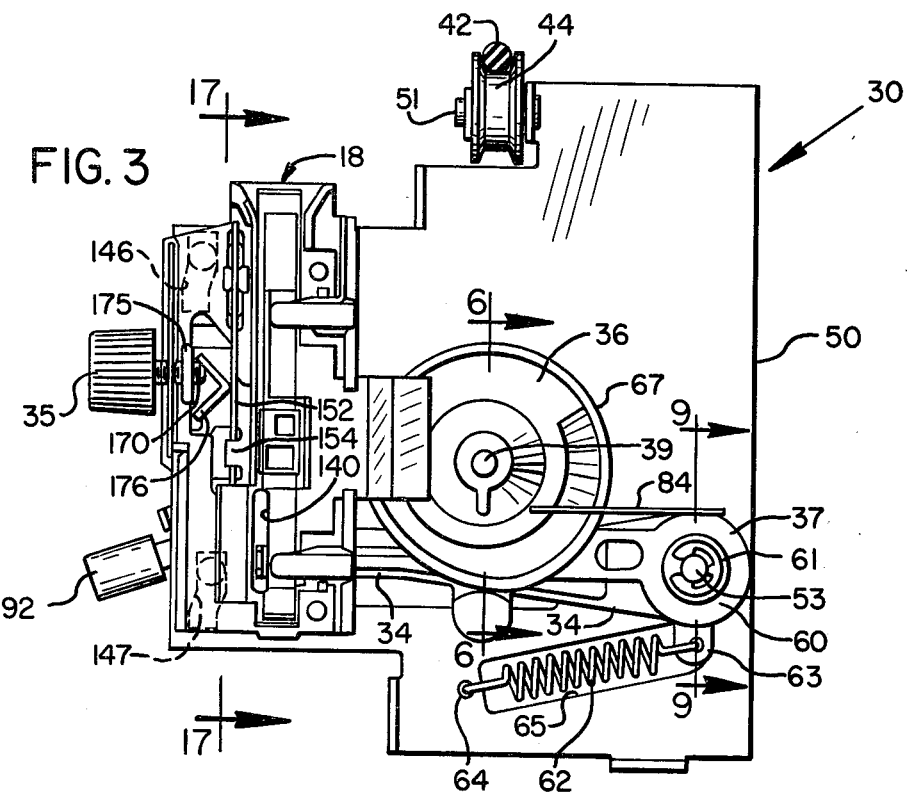
FIG. 3 is a side elevation view of the film transport and control module of the invention taken along the lines 3—3 of FIG. 2, and shown removed from the projector.
Figure 4:
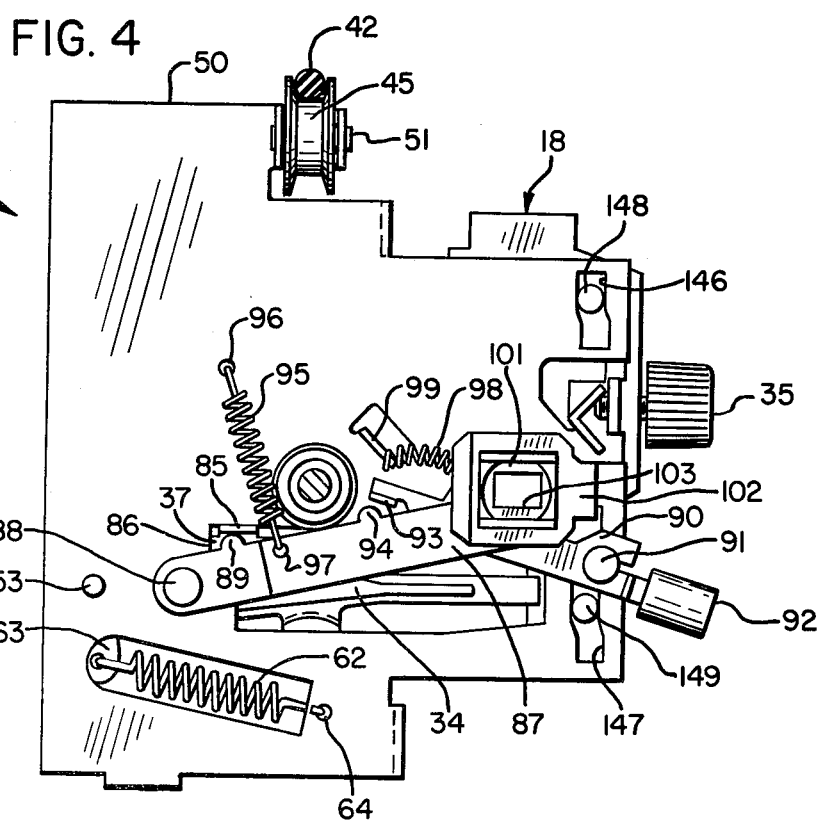
FIG. 4 is a side elevation view of the side of the film transport and control module opposite that shown in FIG. 3, taken along the lines 4—4 of FIG. 2 and illustrating the still mode of operation with the shutter removed.

In order to shift the mode of operation from the normal projection mode to the still position for rewind and threading operations, the shifter 37 includes an actuating arm 84 extending at right angles from the top edge thereof as best seen in FIGS. 2, 3 and 9. Upon rotation of cam 200 by means of control knob 31, actuating bracket 209 is adapted to engage actuating arm 84 to pivotally move the same about shaft 53 between a first position shown in FIG. 8 in which cam follower projection 81 slidably engages the flat cam surface 71 to hold the claw out of engagement with the film for loading and rewinding, and a second position shown in FIG. 7 in which cam follower projection 81 rides upon cam section 72 of the cam face for normal forward projection.

It should be noted that cam follower projection 81 has a straight cylindrical surface 81a so that shifting from the normal projection mode to the still mode cannot be accomplished when said cam follower projection 81 is riding at the full depth of cam surface 73. Mode shifting becomes possible only when cam follower projection 81 is positioned at least approximately fifty percent up either of the inclined cam surfaces 74 or 75, and preferably not until projection 81 slidably engages cam surface 76. This will insure that a full frame is positioned in the aperture for still mode projection during shifting operation.

Figure 5:
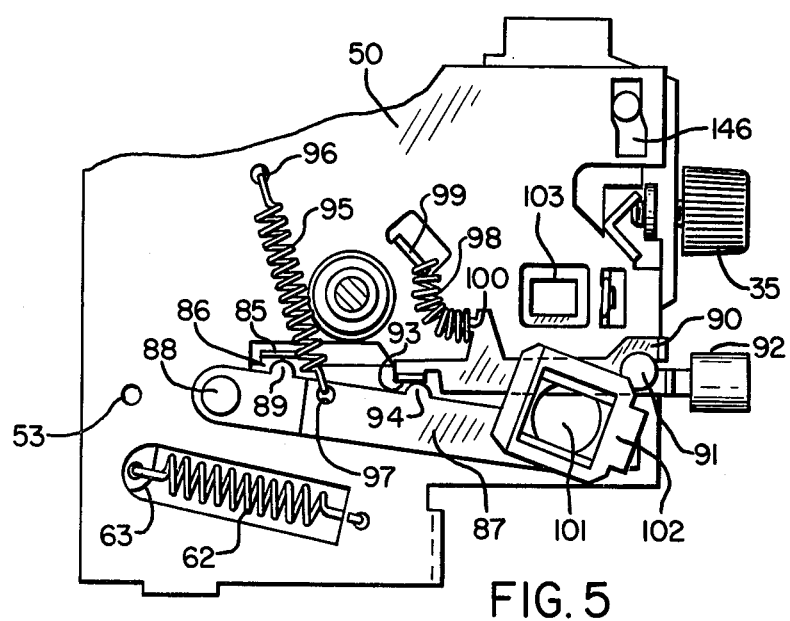
FIG. 5 is a partial side elevation view of the film transport and control module similar to that shown in FIG. 4 illustrating the position of the control linkage in the forward mode of operation.

For still projection it is necessary to filter the infrared radiation from the projection bulb to avoid burning the film. Accordingly, additional mode selection means, which include a suitable filter to be interposed between the light source and the film gate during still projection, is provided for transferring the shifter 37 from its second or normal projection position to its first or still projection position. In this regard, shifter 37 includes a tab 85, shown in FIGS. 4, 5 and 9, which projects at right angles from the top portion of the shifter in the opposite direction from actuator arm 84. The tab extends above the shuttle 34 and through an opening 86 formed in module plate 50. A shift arm 87 is mounted for pivotal movement about a pin 88 disposed on the module plate 50 on the side opposite from the shuttle and shifter mechanisms. A lobe 89 is formed on the upper edge of shift arm 87 in a position for engagement with the under surface of the tab 85 of the shifter 37. It can be seen that pivotal movement of the shift arm 87 from the position shown in FIG. 5 to the position shown in FIG. 4 causes lobe 89 to lift tab 85 and thereby transfer the shifter 37 from the forward mode of operation to the still mode of operation. Such pivotal movement of shift arm 87 is facilitated by means of a lever 90 mounted for pivotal movement on a pin 91 extending from the module plate 50. One end of the lever 90 extends beyond the face of the projector case and includes knob 92 for use by the operator in manually positioning the shift arm 87 to switch from the forward mode of operation to the still mode of operation. A flat abutment surface 93 is formed on the underside of lever 90 at the opposite end from knob 92 and is adapted to engage a second lobe 94 formed on the upper edge of shift arm 87 at a midpoint thereof. A helical tension spring 95 connected at one end to module plate 50 through a suitable opening 96 and at the other end to shift arm 87 through a suitable opening 97 urges the shift arm into the still position shown in FIG. 4. A second spring (not shown) connected to actuator bracket 209 acts upon actuator arm 84 of the shifter 37 to bias the same into a position for normal or forward projection. It is the action of such spring which maintains the operative engagement between tab 85 of the shifter and lobe 89 of shift arm 87. It should be noted that the upward force of spring 95 is greater than the downward biasing force acting upon actuator arm 84, so that the engagement of lobe 89 with tab 85 as the shift arm is moved from the position shown in FIG. 5 to the position shown in FIG. 4 overcomes the spring force on the shifter to pivotally move the same into the still position. A compression spring 98 connected at one end to the module plate 50 by means of a tab 99 and connected at the other end to a projection 100 formed on lever 90 operates as an overcenter detent to urge lever 90 into one of its two operating positions.

An infra-red filter 101 is mounted in a holder 102 fixedly disposed at the end of shift arm 87 and offset therefrom. Movement of the shift arm into the still mode of operation positions filter 101 for proper filtering action along the optical axis of the projector. In the preferred embodiment, the filter 101 comprises a "hot mirror" adapted to reflect undesirable radiation back toward the light source and to pass only non-damaging light for still projection. In this regard, it should be also noted that the module plate 50 includes a rectangular aperture 103 disposed for alignment along the optical axis when the module 30 is properly assembled in the projector housing. The aperture 103 serves to help eliminate the undesirable transmission of radiation through the film toward the projection screen and through the lens system.

Film Gate-Framer Assembly

The film gate assembly shown generally at 18 constitutes a significant aspect of the film transport and control mechanism module 30, since it is adapted to perform the three-fold function of guiding the film past the optical axis for projection, shifting the capability of the projector from super 8mm film to regular 8mm film, and, finally, properly aligning the film frames and the projection aperture.

Figure 14:
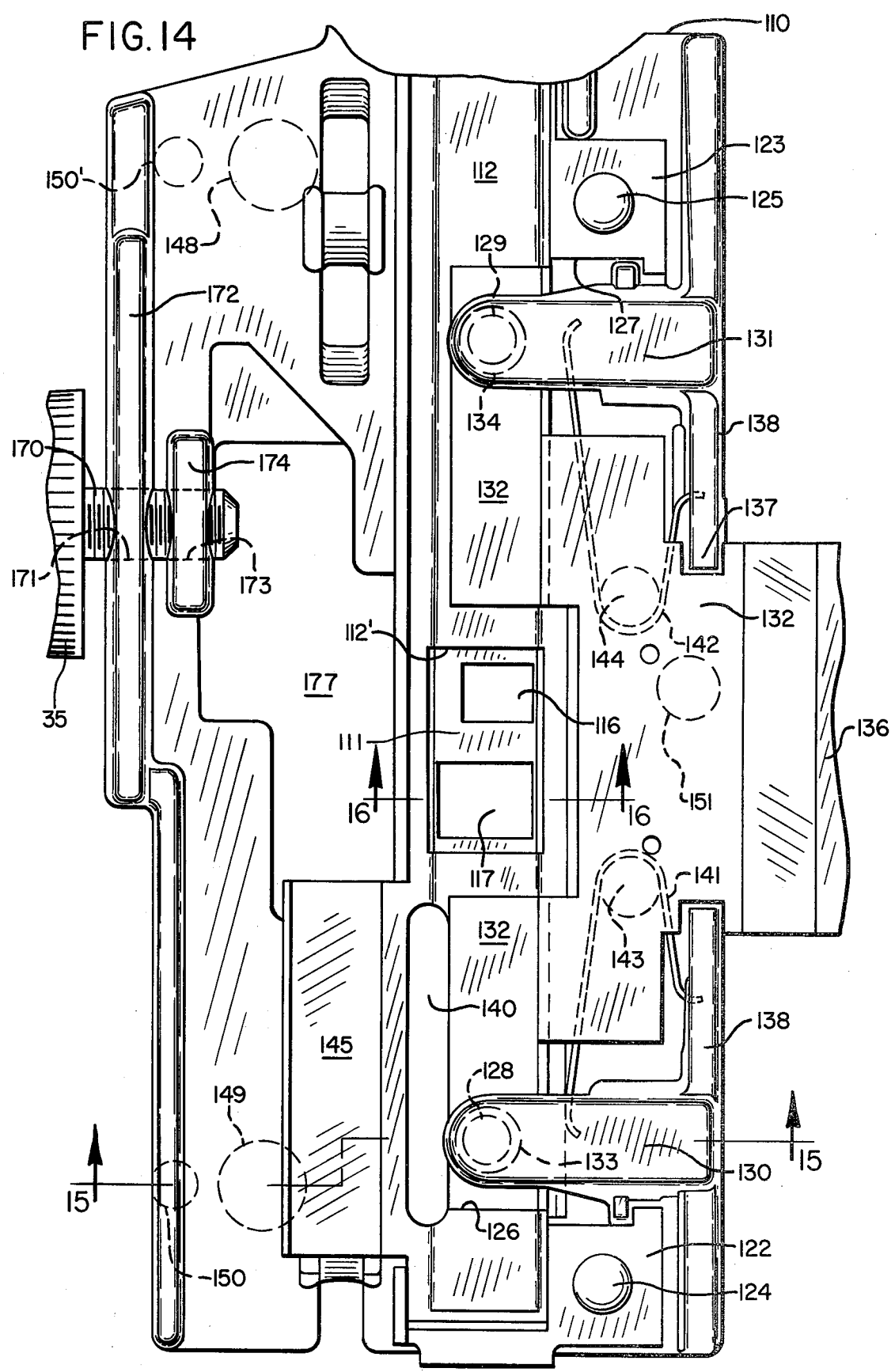
FIG. 14 is a partial side elevation view of the film gate and framer mechanism of the module.

Referring to FIGS. 14, 15 and 16 it can be seen that the film gate assembly 18 comprises a molded housing 110 formed of suitable plastic material, and an elongated aperture plate 111 and a corresponding pressure plate 112 both disposed in parallel juxtaposition within housing 110. The aperture plate 111 has a shoulder 113 formed along one edge thereof and a pair of spaced apart rails 114 and 115 upon which the film 16 rides. As shown in FIG. 14 aperture plate 111 includes two apertures 116 and 117 adapted for the projection of regular 8mm film and super 8mm film, respectively. Each of said apertures 116 and 117 can be selectively positioned along the optical axis of the projector for projecting either of said film sizes. The means for accomplishing such selective positioning will be described in detail hereinafter. The pressure plate 112 is also formed with a shoulder 118 extending along one edge thereof, and a pair of spaced apart rails 119 and 120 against which the film 16 rides. As shown in FIGS. 15 and 16 the aperture plate 111 and the pressure plate 112 define a recess or channel 121 through which the film 16 passes. Pressure plate 112 is provided with an opening 112' in alignment with the optical axis of the projector, which opening is sufficiently large so as to encompass both apertures 116 and 117 of the aperture plate to pass projection light in both the super 8mm and regular 8mm modes of operation.

Referring to FIG. 16, the shoulders 113 of the aperture plate 111 and 118 of the pressure plate 112 are respectively located at the opposite sides of the film channel 121 so as to form edge guides for the film. In this regard, the desired distance between the inside surface 118' of shoulder 118 and the end 119' of rail 119 on pressure plate 112 engaging the filming is approximately in the range of two to seven thousandths of an inch smaller than the minimum width of film 16. Similarly, the desired distance between the inside surface 113' of shoulder 113 and the end 115' of rail 115 on the aperture plate, upon which the film will ride, is also approximately in the range of two to seven thousandths of an inch smaller than the minimum width of the film. This dimensioning allows the width of the film channel 121 to correspond exactly to the width of the film regardless of its tolerances.

The aperture plate 111 includes a pair of outwardly extending substantially square flanges 122 and 123 shown in FIG. 14, each of which include circular openings. A pair of rivets 124 and 125 extend through the openings formed in flanges 122 and 123, respectively, to secure the aperture plate to the molded housing 110. The flanges 122 and 123 also include abutments surfaces 126 and 127 respectively. The distance between such abutment surfaces corresponds to the length of the shoulder 118 on the pressure plate so that the longitudinal ends of the shoulder 118 are juxtaposed adjacent the abutment surfaces 126 and 127, to maintain proper longitudinal positioning of the pressure plate with respect to the aperture plate.

The molded housing 110 includes a pair of cylindrical posts 128 and 129 which project downwardly toward the pressure plate on opposite sides of the projection apertures. Posts 128 and 129 are integrally formed as part of the molded housing 110 and are connected thereto by means of molded brackets 130 and 131, respectively. Interposed between the bottom of posts 128 and 129 and the pressure plate 112 is a pressure relieving plate 132. The pressure plate 112 and the pressure relieving plate 132 are held in place on the top surface of the aperture plate by means of two helical compression springs 133 and 134 which are disposed, respectively, around posts 128 and 129. A shoulder 135 is formed at the intersection of post 128 and bracket 130 to provide a bearing surface for the upper end of spring 133 and a similar shoulder (not shown) is provided at the intersection of post 129 and bracket 131 to form a bearing surface for spring 134. The lower ends of springs 133 and 134 bear against pressure relieving plate 132 to secure such plate and the pressure plate disposed beneath it in their proper respective positions.

The pressure relieving plate 132 has a lever arm 136 outwardly extending from the middle of one edge. A portion of lever 136 bears against the top surface 137 of an upwardly extending rib 138 formed as part of the molded housing 110 to provide a fulcrum line for said lever. The exertion of a downward force upon the end of lever 136 pivotally moves the pressure relieving plate 132 about fulcrum 137 to relieve the pressure of springs 133 and 134 upon the pressure plate 112 to permit loading and rewinding of the projector. An actuator arm 139 shown in FIG. 15 is operatively connected to actuator bracket 209 to actuate the pressure relieving plate 132 when cam 200 is placed in its loading and rewinding positions simultaneously with the transfer of shifter 37 into the position to prevent the claw member from engaging the film.

The pressure plate 112 and the aperture plate 111 are both formed with corresponding longitudinally extending aligned slots 140 to provide access for the claw member 35 to engage the film sprockets passing between said plates during normal projection.

To maintain transverse positioning of the pressure plate 112 with respect to the aperture plate 111, a pair of guide pressure leaf springs 141 and 142 are mounted within the housing 110 by means of upstanding molded posts 143 and 144, respectively. One end of springs 141 and 142 are adapted to engage and bear against upstanding rib 138 and the other end of said leaf springs bear against opposite ends of shoulder 118 of the pressure plate 112. The extended length of the shoulders 118 and 113 of the pressure plate and aperture plate provide a large area of contact with the side edges of the film, and thereby minimize excessive unit pressure and wear on the film. The use of the shoulders transmits the pressure exerted from springs 141 and 142 evenly over an extended length of film rather than mere contact points as is prevalent in prior art film gate constructions.

In addition to the foregoing, the pressure plate 112 has a tab 145 extending upwardly from one side thereof at an angle of approximately 45 degrees. Upward movement of said tab 145 causes the pressure plate to pivotally move in a clockwise direction as seen in FIG. 15 about rail 115 of aperture plate 111 to provide access to the film gate area for inserting and removing film therefrom in a transverse direction.

The film gate assembly 18 is slidably mounted on the module plate 50 to permit longitudinal shifting between the super 8mm projection position in which aperture 117 is in alignment with the optical axis and the regular 8mm projection position in which aperture 116 is in alignment with the optical axis. Moreover, since the transverse location of the sprocket holes on regular 8mm film differs from the transverse location of such holes on super 8mm film. The film gate assembly 18 is also adapted for transverse sliding movement to properly position the sprocket holes of each of such differing films for engagement by the claw mechanism. To accomplish such movement module plate 50 is formed with a pair of off-set slots 146 and 147 shown in FIGS. 3, 4 and 15. The molded housing 110 is formed with a pair of cylindrical projections 148 and 149 which slidably engage said off-set slots 146 and 147, respectively. The side of the molded housing 110 facing the module plate 50 is formed with bearing surfaces 150, 150' and 151 (preferably in the shape of semi-spheroids) projecting from the plate and adapted to slidably engage the surface of module plate 50.

A bow-shaped wire spring 152 shown in FIG. 17 is provided to hold the film gate assembly 18 in sliding contact with module plate 50 and lock the same in the selected longitudinal position for projection of regular 8mm or super 8mm film. Spring 152 is profiled so that a center recess therein 153 extends around a projection 154 formed in an opening 155 in module plate 50. Oppositely extending arms 156 and 157 having detents 158 and 159 formed at the respective distal ends thereof are positioned for sliding engagement in one of two sets of recesses formed in the surface of the molded housing 110. The first set of recesses 160 and 160a are defined by sloping side walls 161 and 162 and 161a and 162a, respectively. The second set of recesses 163 and 163a are defined by sloping walls 164 and 165 and 164a and 165a, respectively. When projecting regular 8mm film, the detents 158 and 159 are positioned in recesses 160 and 160a, respectively, and said spring detents, exert longitudinal pressure against the sloping side walls 162 and 162a. When projecting super 8mm film, the film gate assembly will be shifted upward from the position shown in FIG. 3 causing detents 158 and 159 to engage recesses 163 and 163a and to exert an upward pressure against side walls 164 and 164a. In each of such positions, the spring 152 also exerts transverse pressure on the corresponding sloping side walls of the recesses in which the detents 158 and 159 are engaged so that the film gate assembly will be held firmly against the module plate 50 for proper sliding engagement.

Movement of the molded assembly from the super 8mm position to the regular 8mm projection position is manually accomplished by the operator moving knob 35 in either an upward or downward direction to position the appropriate aperture on the optical axis. It will be noted that during the longitudinal movement of the molded housing 110, transverse movement of the film gate to properly align the film sprockets of regular 8mm or super 8mm film with the shuttle claw mechanism is also accomplished by means of the sliding engagement of projections 149 and the off-set slots 146 and 147 respectively.

Knob 35 is fixedly connected to the end of a threaded shaft 170 which extends through a correspondingly threaded opening 171 formed on an upstanding shoulder 172 of the molded housing 110, and a second threaded opening 173 formed in a light shield 174 also carried as part of housing 110. Referring specifically to FIG. 3 it can be seen that the module plate 50 has formed therein a pair of inclined cam surfaces 175 and 176 disposed at right angles to each other, and at an angle of approximately 45 degrees with respect to the axis of threaded shaft 170. The molded housing 110 is formed with an open area 177 through which the inclined cam surfaces 175 and 176 extend. When the film gate assembly 18 is in the regular 8mm projection position, the end of threaded shaft 170 will contact cam surface 176. When the film gate is in the super 8mm position, the end of threaded shaft 170 will engage cam surface 175. It can be seen, therefore, that the limit of longitudinal movement of the molded housing 110 along the module plate 50 is determined by the abutment of the end of threaded shaft 170 with either cam surface 175 or cam surface 176, which thereby serve to properly position the desired film aperture on the optical axis of the projector.

In order to obtain fine adjustment or framing of the aperture opening along the optical axis threaded shaft 170 can be adjusted by rotating knob 35 to move inwardly or outwardly and thus ride along one or the other of the inclined cam surfaces. The engagement of the shaft and one or the other inclined cam surfaces causes the assembly to move in the appropriate longitudinal direction the desired amount to finely adjust the framing. It should be noted in this regard that the longitudinal pressure of spring 152 against the appropriate sloping surfaces of the molded housing 110 causes the abutment end of threaded shaft 170 to be positively urged into sliding contact with one or the other of cam surfaces 175 or 176.

Shutter

Figure 6:
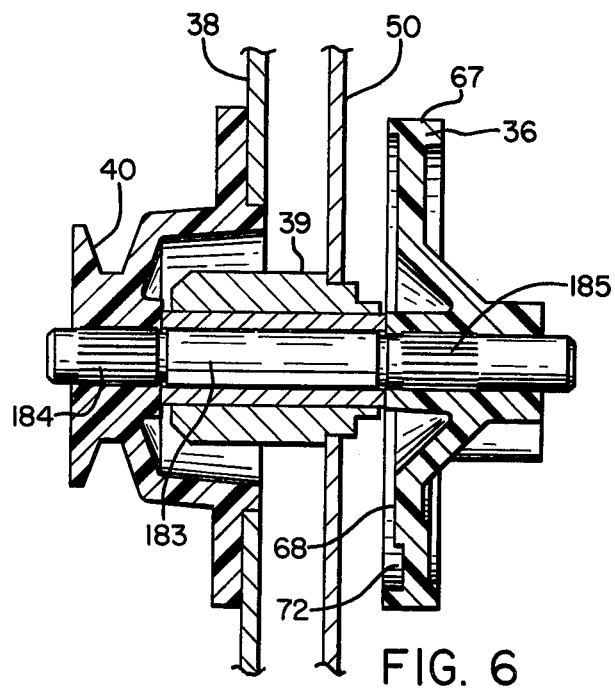
FIG. 6 is a cross-sectional view taken along the lines 6—6 of FIG. 3 and illustrating the shuttle drive cam.

The rotatable shutter which forms a part of module 30, as shown in FIGS. 2, 6 and 19, is secured to the drive pulley 40 by means of rivets or other suitable fastening means 180. The shutter comprises a circular disc having a solid peripheral ring 181 and three equally spaced equal size arcuate openings 182 which permit the passage of projection light when the same are aligned with the projection aperture. The pulley 40 is press fit on one end of a shaft 183 having a knurled surface 184 to firmly secure the pulley 40 and the shutter mounted thereon in place. The shaft 183 is journaled for rotational movement with a shaft bushng 39 fixedly attached to an opening in module plate 50. The opposite end of shaft 183 also contains a knurled surface 185, which is press-fit within a suitable opening formed in the drive cam 36. The exact angular position of the shutter with respect to the angular position of the drive cam 36 is precisely set during the manufacturing process so that the opening 182 in the shutter will be fully synchronized with the movement of the shuttle to insure proper projection. The solid ring 181 formed on the outer periphery of the shutter increases the inertial mass thereof to provide additional driving force for drive cam 36.

Upon consideration of the foregoing, it wil become obvious to those skilled in the art that modifications may be made to the modular film transport and control mechanism without departing from the invention embodied therein. For example, the module can be rotated 90 degrees and the film fed horizontally through the film gate. In such event it will be understood that references to horizontal and vertical movement of the shuttle are merely relative terms referring to the position of the shuttle with respect to the film path.

While the invention has been described and illustrated with respect to a certain preferred embodiment which gives satisfactory results, it will be understood by those skilled in the art, after understanding the purpose of the invention, that various other changes and modifications may be made without departing from the spirit and scope of the invention.

What is claimed is:

1. A modular film transport and control mechanism for selectively advancing perforated motion picture film of different frame formats past the optical axis of a projector comprising, in combination, a module plate adapted to be installed within the projector; a film gate assembly having a passageway for the film and a pair of projection apertures corresponding in size to the frames of the different film formats; said gate assembly being slidably disposed on the module plate for selective movement to align one or the other of said apertures with the optical axis; a film transport shuttle pivotally mounted on the module plate having a right angle claw member at one end for engagement with the perforations of the film and a cam follower extending perpendicularly at substantially a midpoint thereof; a unitary drive cam rotatably disposed on the module plate having a cam face with at least two concentric cam sections corresponding to the forward and still modes of projection, and an outer peripheral cam surface adapted to slidably engage the cam follower on the shuttle to impart reciprocal motion thereto in a direction parallel to the film path; and shifter means pivotally disposed on the module plate between the shuttle and the drive cam face and having camming means in contact with both to transmit reciprocal motion from the cam face to the shuttle; said shifter being selectively movable between a forward position in which the camming means is in engagement with one of said concentric cam sections to transmit reciprocal motion to the shuttle in a direction perpendicular to the film path to move the claw into and out of engagement with the film perforations in synchronization with the parallel motion of the shuttle to effectuate incremental film advancement in the forward mode of projection, and a still position in which the camming means is in engagement with the other concentric cam section to retain the shuttle claw out of engagement with the film perforations in the still mode of projection.

2. A film transport and control mechanism in accordance with claim 1, in which the module plate includes a pair of cam surfaces extending therefrom; and the film gate assembly includes a transversely positioned adjustment screw adapted to contact one of said cam surfaces when one of the projection apertures is in alignment with the optical axis and the second cam surface when the other aperture is in alignment with the optical axis; said cam surfaces being juxtaposed at an angle with respect to said screw, so that rotation of the screw imparts longitudinal movement to the film gate assembly to finely adjust the position of the selected aperture and the film frames.

3. A modular film transport and control mechanism in accordance with claim 1, further comprising a bow-shaped wire spring having a center recess connected to said module plate and a pair of oppositely extending spring arms defining detents at the respective distal ends thereof; and in which the film gate assembly includes a series of recesses for engagement by said spring arm detents to hold the film gate assembly in sliding contact with the module plate and lock the same in the desired position.

4. A modular film transport and control mechanism in accordance with claim 1, further comprising a drive shaft journaled through the module plate and carrying the drive cam at one end; and a rotatable shutter mounted at the other end of said shaft.

5. A modular film transport and control mechanism in accordance with claim 4, in which the shutter has a central hub defining a pulley for connection to suitable drive means to impart rotational movement to the shutter and the drive cam during projection.

6. A modular film transport and control mechanism in accordance with claim 1, in which the shuttle is formed of resilient material and is internally biased into engagement with the shifter means.

7. A modular film transport and control mechanism in accordance with claim 1, further comprising a manually controllable shift arm pivotally disposed on the module plate in engagement with the shifter means to move the shifter means between the forward and still projection positions.

8. A modular film transport and control mechanism in accordance with claim 7, in which the shift arm carries a heat shield and is adapted to position said heat shield along the optical axis between the film gate assembly and a projection light source in the still position to prevent burning of the film.

9. A film transport control mechanism for advancing perforated motion picture film through a projection gate of a motion picture projector comprising a film transport shuttle mounted for both horizontal and vertical reciprocating movement and having a claw member at one end; a unitary rotatable drive cam having a peripheral cam surface in operative engagement with said shuttle to impart vertical reciprocating motion thereto, and having a cam face comprising a first cam section to impart horizontal reciprocating motion to the shuttle in synchronization with the vertical reciprocation so that said claw intermittently engages the film perforations to pull the film through the gate, and a second cam section to hold the shuttle in a position in which the claw member is prevented from engaging the film perforations; and shifter means interposed between the shuttle and the cam face of the drive cam to transmit horizontal reciprocating motion from the cam face to the shuttle; said shifter means being selectively movable between a forward projection position in which it engages the first cam section of the drive cam and a still projection position in which it engages the second cam section of the drive cam.

10. A film transport mechanism in accordance with claim 9, in which the shuttle is biased into engagement with the periphery of the drive cam and the shifter means.

11. A film transport mechanism in accordance with claim 9, in which the shuttle has a cam follower in sliding engagement with the periphery of the drive cam; and the shifter means has a cam follower in sliding engagement with the face of the drive cam.

12. A film transport mechanism in accordance with claim 11, in which the shuttle and the shifter means have corresponding camming surfaces in sliding engagement.

13. A film transport mechanism in accordance with claim 9, in which the shifter means comprises an elongated pivotally mounted lever having a cam follower in sliding engagement with the face of the drive cam and a tab extending therefrom; and a pivotally mounted shift arm in operative engagement with said tab to selectively move the lever between the forward and still positions.

14. A film transport mechanism in accordance with claim 13, in which the shift arm carries a heat shield which is moved into alignment with the projection gate in the still position.

15. A film transport mechanism in accordance with claim 9, in which the claw member extends at a right angle with respect to the shuttle; and said shuttle is formed of resilient material which biases the claw member toward engagement with the film perforations.

16. A film transport mechanism in accordance with claim 9, in which the drive cam is operatively connected to a drive motor.

17. In a motion picture projector of the type adapted to selectively receive perforated film having at least two different frame size formats, for projection on a remote screen, an improved projection gate assembly comprising, in combination, a mounting plate; a housing slidably disposed on said plate; an elongated aperture plate and a corresponding pressure plate disposed in parallel juxtaposition within said housing and defining a passageway for the film therebetween; said aperture plate having at least two projection apertures formed therein corresponding to the different film frame sizes, and said pressure plate having an enlarged opening encompassing both apertures in the aperture plate; and a bow-shaped spring having a central recess connected to the mounting plate and a pair of oppositely extending spring arms the distal ends of which are in engagement with the housing to hold the same in sliding contact with the mounting plate and to secure the same in a first position in which one aperture of the aperture plate is in a position for projection of one format film, and a second position in which the other aperture of the aperture plate is in a position for projection of the other format film.

18. A projection gate assembly in accordance with claim 17, in which the distal ends of the spring arms have detents formed therein; and the housing has a first pair of recesses formed therein for engagement by the detents on the ends of the spring arms in the first position of the housing; and a second pair of recesses formed therein for engagement by the detents on the ends of the spring arms in the second position of the housing; the interaction of said detents and said recesses serving to lock the housing in the desired position.

19. A projection gate assembly in accordance with claim 17, further comprising biasing means disposed within the housing to hold the pressure plate in contact with the aperture plate.

20. A projection gate assembly in accordance with claim 17, in which the aperture plate has a shoulder extending along one edge; and the pressure plate has a shoulder extending along the opposite edge so as to define edge guides for the film.

21. A projection gate assembly in accordance with claim 17, in which the mounting plate includes a pair of inclined cam surfaces; and the housing includes an adjustment screw threadably connected thereto, one end of which is adapted to bear against one of said cam surfaces in the first position and the other of said cam surfaces in the second position so that rotation of the screw causes movement of the housing to properly align the selected aperture with each film frame.

22. A projection gate assembly for motion picture projectors comprising a housing having a film passageway and a pair of alternate projection apertures corresponding in size to the frames of 8mm and super 8mm film; a plate upon which said housing is disposed for longitudinal sliding movement to place one or the other of said apertures in a position for projection; and a bow-shaped spring connecting the plate and the housing adapted to hold the housing in sliding contact with the plate and to lock the same in the desired projection position.

23. A projection gate assembly in accordance with claim 22, in which means are included to slidably move the housing along the plate in a direction transverse to the film passageway simultaneously with the longitudinal sliding movement to properly position the perforations of said 8mm and super 8mm film for engagement by a film advancing means.

24. A projection gate-framer assembly for motion picture projectors comprising a mounting plate having an inclined cam surface; projection gate means slidably disposed on said mounting plate adjacent said cam surface and having a film passageway and a projection aperture; and a framing adjustment screw threadably connected to said gate means substantially perpendicular to the passageway with one end thereof adapted to bear against said cam surface, so that rotation of the screw causes longitudinal movement of the gate means to properly align the projection aperture with the frames of the film being projected.

* * * * *